United States Patent [19]

Hohwart et al.

[11] 3,873,107

[45] Mar. 25, 1975

[54] ADJUSTABLE WORK HOLDER WITH FRONT AND REAR WORK HOLDING JAWS

[75] Inventors: George Hohwart, Howell; Paul Toth, Allen Park; Kenneth O. Cross, Northville, all of Mich.

[73] Assignee: N. A. Woodworth Company, Detroit, Mich.

[22] Filed: Apr. 25, 1973

[21] Appl. No.: 354,440

[52] U.S. Cl................................. 279/1 D, 279/123
[51] Int. Cl............................................ B23b 31/32
[58] Field of Search............... 279/1 D, 1 SJ, 1 Q, 4, 279/123

[56] References Cited
UNITED STATES PATENTS

| | | | |
|---|---|---|---|
| 3,151,862 | 10/1964 | Nicosia | 279/123 X |
| 3,244,430 | 4/1966 | Buck | 279/123 X |
| 3,248,121 | 4/1966 | Volpe | 279/123 X |
| 3,455,567 | 7/1969 | Hohwart | 279/123 X |
| 3,479,042 | 11/1969 | Hohwart | 279/123 |

*Primary Examiner*—Andrew R. Juhasz
*Assistant Examiner*—Z. R. Bilinsky
*Attorney, Agent, or Firm*—Harness, Dickey & Pierce

[57] ABSTRACT

A chuck assembly of the type adapted to be mounted on a spindle of a machine tool including adjusting means for accurately aligning the central axis around which the work engaging jaws are disposed with the longitudinal axis of rotation of the machine tool spindle on which the chuck assembly is mounted. The work engaging jaws are of a composite construction, each including a main section and an insert section which is replaceable and which includes a first work engaging abutment for substantially rigidly engaging a piece of work and a second abutment axially spaced from the first abutment for yieldably engaging a piece of work and serving as a steady rest.

8 Claims, 2 Drawing Figures

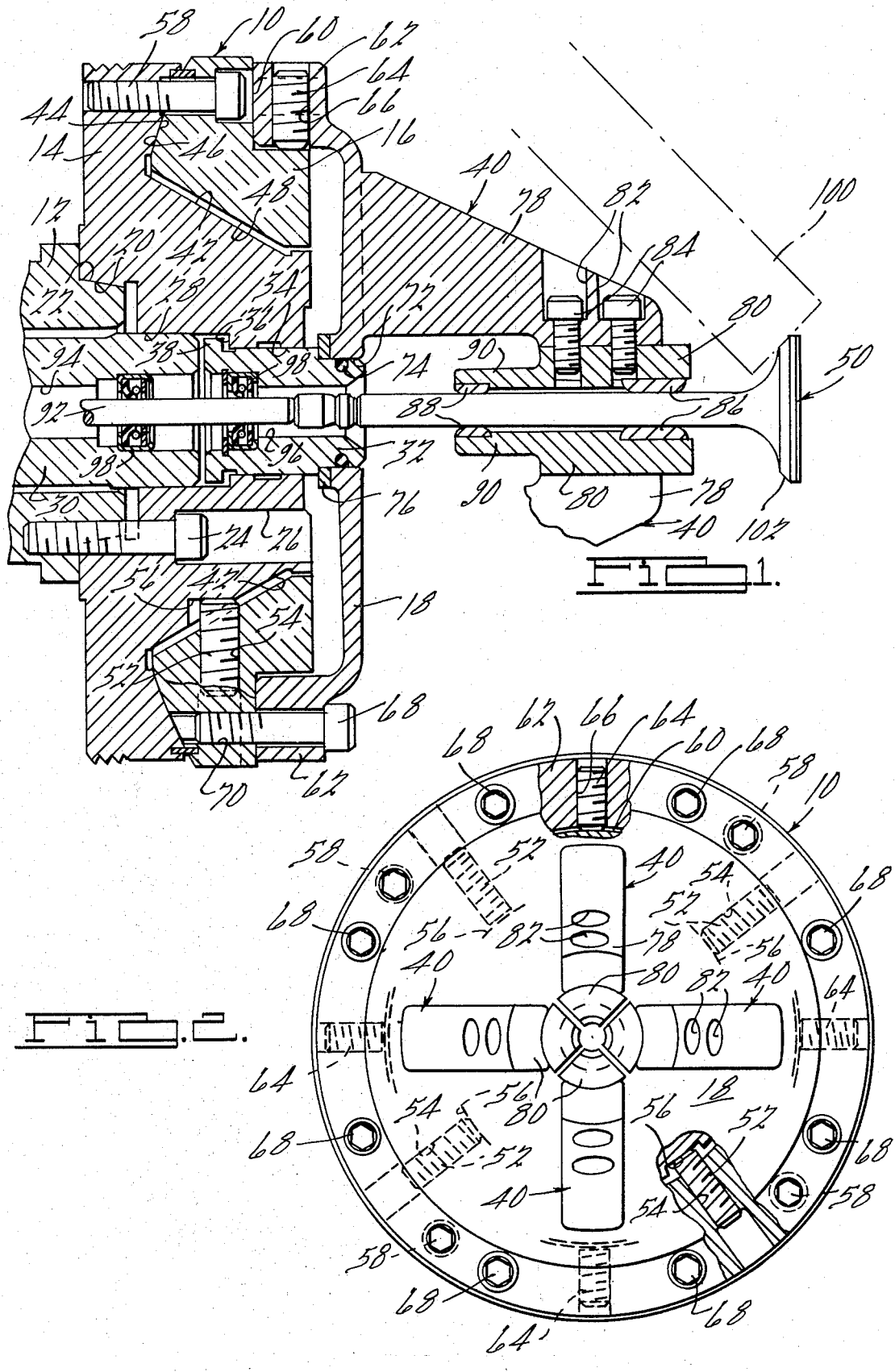

ADJUSTABLE WORK HOLDER WITH FRONT AND REAR WORK HOLDING JAWS

BACKGROUND OF THE INVENTION

The present invention relates to chuck assemblies of the general types which are adapted to be mounted on the spindle of a machine tool for accurately holding a workpiece during a machining operation. Problems are frequently encountered with chuck assemblies of the types designed to chuck elongated workpieces such as poppet-type engine valves, water pump shafts and replaceable pierce-type punches and the like in which the workpiece extends a substantial distance forwardly of the work engaging jaws to provide sufficient access for the cutting tool to act on the surface of the workpiece to be machined. The projection of the workpiece in unsupported relationship beyond the work engaging jaws serves to amplify any misalignment present between the axis of the workpiece and the longitudinal axes of the chuck and machine tool assembly which detracts from achieving the precise dimensional accuracy required in many instances.

The resiliency of the unsupported portion of the workpiece projecting forwardly of the work engaging jaws has also occasioned some difficulty in achieving the desired machining accuracy and/or surface finish. The seriousness of this problem is dependent, to some extent, on the type of machining operation being performed, the type of workpiece being machined and the distance at which the machining operation takes place from the forward portion of the work engaging jaws.

Some of the foregoing problems have been overcome by employing work holding chucks of the double-diaphragm type such as shown in U.S. Pat. No. 2,565,430, which is assigned to the same assignee of the present invention. The cost of such double-diaphragm type chucks and the high degree of care and skill required to effect an accurate adjustment has somewhat detracted from a more widespread use thereof. The difficulty of maintaining such chucks in precise adjustment has been further aggravated by a gradual wear during use of the work engaging jaws and the periodic change in the types of workpieces being processed, requiring a change in the chuck assembly or a major modification in the adjustment of the engaging jaws in order to accommodate such different workpieces.

The chuck assembly of the present invention overcomes the problems and disadvantages associated with prior art work holders in providing a chuck which is of durable operation, simple construction, versatile use, easy to adjust and maintain in accurate alignment, and of economical cost.

SUMMARY OF THE INVENTION

The benefits and advantages of the present invention are achieved by a chuck assembly of the general type adapted to be mounted on the spindle of a machine tool and which comprises a chuck body having a plurality of work engaging jaws supported thereon for radial movement with respect to the longitudinal central axis of the chuck assembly between a work engaging position and a nonengaging position radially spaced therefrom. In accordance with one embodiment of the present invention, each engaging jaw is of a composite construction including a main section supported by the chuck body and an insert section removably secured to the main section and defining the engaging face of the jaw. The insert section is provided with a first abutment or gripper for substantially rigidly engaging a piece of work and a second abutment or gripper axially spaced from the first abutment for yieldably engaging a piece of work and serving thereby as a steady rest.

In accordance with a second embodiment of the present invention, the chuck body is of a composite construction including a spindle adapter or mounting member for securing the chuck assembly to the spindle of a machine tool with its longitudinal central axis disposed substantially coincident with the rotational axis of the machine tool spindle and a second member or leveling plate adjustably mounted on the adapter member on which the work engaging jaws are supported. The leveling plate is mounted for restricted swiveling movement relative to the adapter member whereby the central axis of the engaging jaws can be adjusted so as to be in precise alignment with the longitudinal axis of the machine tool spindle assuring accurate finishing of the workpiece held thereby.

Additional benefits and advantages of the present invention will become apparent upon a reading of the description of the preferred embodiments taken in conjunction with the accompanying drawing.

BRIEF DESCRIPTION OF THE DRAWING

FIG. 1 is a fragmentary vertical longitudinal sectional view of a chuck assembly contructed in accordance with the preferred embodiments of the present invention and illustrating a typical workpiece, such as a poppet-type engine valve, accurately held thereby relative to a cutting tool; and FIG. 2 is an elevation view, partly in section, of the face of the chuck assembly as shown in FIG. 1.

DESCRIPTION OF THE PREFERRED EMBODIMENTS

Referring now in detail to the drawing, a chuck assembly 10 is illustrated which, in the exemplary embodiment shown, is of a diaphragm-type and which is adapted to be securely mounted on the end portion of a machine tool spindle 12. The chuck assembly 10 is comprised of a chuck body which is of a composite construction including an adapter member or mounting member 14, a leveling member 16 adjustably secured to the adapter member and a diaphragm 18 affixed to the leveling member and overlying the face of the chuck.

The adapter member 14 is piloted on the end of the spindle 12 is substantial axial alignment with the spindle axis by means of an inwardly axially extending tapered bore 20 which is adapted to be disposed in seated engagement on a tapered shoulder 22 formed on the end of the spindle. The adapter member is securely fastened and retained on the spindle by means of six socket head machine screws 24, as shown in FIG. 1, which extend inwardly through bores 26 provided in the opposite side of the adapter member and have the threaded shank end portions thereof disposed in threaded engagement in threaded bores formed in the end of the spindle.

The adapter member is further provided with an axially extending bore 28 which slidably receives the projecting end portion of a push bar or draw bar 30 which comprises an integral component of the machine tool spindle and may be of any of the common types well known and employed in the art. The push bar 30 may be actuated mechanically or hydraulically by means well known and is adapted to abut the adjacent face of a flanged sleeve or pusher 32 slidably disposed in a bore 34 formed in the forward portion of the adapter member 14 and extending in axial alignment with the bore 28. The length of axial reciprocating movement of the pusher 32 outwardly of the bore 34 is controlled by the coaction between a shoulder 36 formed at the intersection of the bores 28 and 34 and the adjacent face of a peripheral flange 38 provided at the rearward end of the pusher 32. The axial reciprocation of the pusher 32 by the push bar 30 effects an axial flexing of the diaphragm 18 and a radial movement of a plurality of engaging jaws 40 mounted on the forward face thereof in a manner and for the purposes subsequently to be described.

The forward portion of the adapter member is recessed to receive the leveling member 16 and is formed with a rearwardly and outwardly extending taper 42 which intersects a radially extending spherical surface 44, the center of which is located substantially on the longitudinal axis of the adapter member and preferably forwardly of the work engaging jaws. The leveling member 16 is formed along its rearward surface with a conforming spherical surface 46 disposed in sliding bearing contact against the spherical surface 44 and is provided with a taper 48 along its inner portion which is disposed in clearance relationship relative to the taper 42 of the adapter member. The sliding coaction between the spherical surfaces 44 and 46 permits restricted swiveling movement of the adapter member relative to the leveling member, whereby the central axis of the engaging jaws, and consequently, the longitudinal axis of a workpiece, such as an engine-type poppet valve 50, can be adjusted so as to be in precise axial alignment with the rotational axis of the chuck assembly and machine tool spindle.

The positioning of the leveling plate in appropriate axial alignment relative to the adapter member is achieved by four socket head set screws 52 arranged in equal circumferentially spaced intervals and in threaded engagement in radially tapped bores 54 formed in the periphery of the leveling member. The inner portions of the set screws 52 are disposed in abutting engagement against flats 56 provided in the taper 42 of the adapter member and enable appropriate swiveling or leveling adjustment of the two members relative to each other. After proper adjustment is achieved, the leveling member is locked in the adjusted position by means of four socket head machine screws 58 extending axially inwardly from the forward face of the leveling member and disposed with their shank portions in threaded engagement in the peripheral portion of the adapter member.

The forward peripheral portion of the leveling member 16 is formed with a square annular recess 60 which is adapted to receive the peripheral rim portion 62 of the diaphragm 18. The diaphragm 18 is also adjustably mounted to permit a centralizing of the diaphragm and the engaging jaws carried thereby with respect to the longitudinal axis of the chuck assembly and the rotational axis of the machine tool spindle. Proper centralizing of the diaphragm and the engaging jaws is achieved by four socket head set screws 64 threadably disposed within radially extending tapped bores 66 positioned at substantially equal circumferentially spaced increments in the rim portion 62 of the diaphragm. The inner ends of the set screws 64 are adapted to be disposed in abutting engagement against the axially extending annular surface of the recess 60 whereby an adjustment of the diaphragm in a plane transverse to the longitudinal axis of the chuck assembly can be effected to appropriately centralize the center axis of the work engaging jaws. Upon achieving the appropriate adjustment, the diaphragm is secured to the leveling plate by eight machine screws 68 extending inwardly from the face of the rim portion of the diaphragm and disposed with the shank portions thereof in threaded engagement in axially extending tapped bores 70 formed in the peripheral portion of the leveling plate.

The diaphragm 18 is of a generally cup-shaped cross section and the center portion thereof is formed with an aperture 72 in which the forward end portion of the pusher is slidably disposed. The inner surface of the diaphragm and pusher are sealed by means of an O-ring 74 and a flat washer 76 is interposed between the pusher and the rearward face of the diaphragm.

In the exemplary embodiment illustrated, the work engaging jaw members 40 project forwardly a substantial distance from the face of the diaphragm to assure the imposition of a considerable amount of leverage on the jaw main sections 78 and the jaw inserts 80 carried thereby to assure a firm retention of a workpiece gripped in the chuck. While four engaging jaws are shown in the drawing, three or more than four jaws can also be satisfactorily used. The main sections 78 are securely fastened to the outer face of the diaphragm 18 and are formed with a pair of radially extending bores 82 in the forward or outer end thereof for receiving socket head machine screws 84 for securely fastening the insert sections 80 to the mounting face thereof.

Each jaw insert section 80 is of an elongated configuration and extends longitudinally of the axis of the chuck assembly. A first abutment or gripping member 86 is mounted at the forward or outer portion of the insert section and is rigidly supported by the overlying forward portion of the main jaw section 78. A second abutment or second gripping member 88 is affixed to the inner or rearward portion of the insert section. As best seen in FIG. 1, the forward portion of the insert section on which the first abutment is mounted is of enlarged cross section so as to rigidly support the first gripping member 86, which in turn is adapted to rigidly engage the shank or stem of work, such as the poppet-type engine valve 50 held in the chuck assembly. The second abutment or gripping member 88, on the other hand, is mounted on the rearward portion of the insert section 80 which, as shown, is of a reduced cross section and extends axially and rearwardly in unsupported relationship relative to the main section 78 in the form of a resilient finger section generally indicated at 90. The finger section 90, accordingly, is adapted to flex radially in response to the engagement of work by the second abutment or gripping member permitting a restricted pivoting movement of the workpiece 50 about a point disposed between the forward gripping members 86. In accordance with this arrangement, the main gripping of the work is achieved by the first abutments 86, while the second abutments 88 serve as a steady rest.

In accordance with the arrangement as illustrated in FIG. 1, the insert sections 80 can readily be replaced by removing the socket head machine screws 84 and substitute insert sections can be secured to the main sections 78 in order to accommodate workpieces of different diameter without appreciably disturbing the adjustment of the chuck assembly. The foregoing feature also enables quick and simple replacement of the jaw insert sections in the event of breakage or as a result of wear, as may be necessary from time to time. In order to reduce the rate of wear, the insert sections are preferably comprised of a hard wear-resistant material, such as tungsten carbide for example.

It is also contemplated in the practice of the present invention that the machine tool spindle can be provided with a longitudinally extending actuator rod 92 which extends centrally through a central bore 94 formed in the machine tool spindle 30 and through a central bore 96 through the pusher 32. A pair of seal assemblies 98 are mounted within the central bores 94, 96 in sealing arrangement around the actuator rod 92 to prevent entry of extraneous matter into the interior of the chuck assembly. The outer end of the actuator rod 92 is disposed in axial abutting alignment against the inward end of the workpiece 50 and is operable in accordance with common and well known procedures for effecting an ejection of the workpiece from the work engaging jaws at the completion of a machining operation in accordance with a predetermined operating cycle of the machine tool.

In the exemplary embodiment illustrated, a grinding wheel 100, as shown in phantom, is adapted to be disposed in abrading relationship against the face 102 of the engine valve 50 for effecting an accurate surface finishing thereof in concentric relationship with respect to the axis of the valve stem. Initial irregularities present on the surface of the valve face are accommodated by the flexing of the second gripping members 88 of the insert sections, assuring accurate machining and the provision of the desired surface finish. Typically, the first gripping members 86 will engage the valve 50 at a pressure of about 7 foot pounds, whereas the second rearward gripping members engage the work with a pressure of about only 2 foot pounds.

While it will be apparent that the invention herein disclosed is well calculated to achieve the benefits and advantages set forth, it will be appreciated that the invention is susceptible to modification, variation and change without departing from the spirit therof.

We claim:

1. In a chuck assembly of the type adapted to be mounted on a spindle of a machine tool, the combination including a chuck body and a plurality of work engaging jaws supported by said chuck body for radial movement with respect to the longitudinal axis of said chuck assembly between a work engaging position and a nonengaging position radially spaced therefrom, each said engaging jaw formed with a work engaging face including a first abutment for substantially rigidly engaging a piece of work and a second abutment axially spaced from said first abutment and disposed on a radially unsupported portion of an axially extending radially deflectable member for yieldably engaging a piece of work with a clamping force less than that of said first abutment.

2. The chuck assembly as defined in claim 1, incorporating at least three said engaging jaws mounted in substantially equal circumferentially-spaced increments about the longitudinal axis of said chuck assembly.

3. The chuck assembly as defined in claim 1, incorporating four said engaging jaws mounted in substantially equal circumferentially-spaced increments about the longitudinal axis of said chuck assembly.

4. The chuck assembly as defined in claim 1, in which each said engaging jaw is of a composite construction including a main section supported by said chuck body and an insert section removably secured to said main section and defining said work engaging face and said abutments thereon.

5. The chuck assembly as defined in claim 1, in which the first and the second abutments are arranged concentrically about the longitudinal axis of said chuck assembly.

6. The chuck assembly as defined in claim 1, in which said first abutment is axially spaced outwardly of said second abutment with respect to said chuck body.

7. The chuck assembly as defined in claim 1, in which said chuck body includes a flexible diaphragm on which said engaging jaws are secured and are radially movable in response to the axial deflection of said diaphragm.

8. The chuck assembly as defined in claim 4, in which said insert section is of an elongated configuration extending axially of the longitudinal axis of said chuck assembly and includes a first portion rigidly supported by said main section on which said first abutment is located and an axially spaced second portion extending in unsupported radially deflectable relationship relative to said first portion on which said second abutment is located.

* * * * *